United States Patent [19]

McNab

[11] Patent Number: 4,847,019
[45] Date of Patent: Jul. 11, 1989

[54] COOLING TOWER

[76] Inventor: John L. G. McNab, 9 Auburn Ave., Myrtle Bank, Australia, 5064

[21] Appl. No.: 198,786

[22] Filed: May 25, 1988

[30] Foreign Application Priority Data

May 26, 1987 [AU] Australia .............................. PI 2134

[51] Int. Cl.[4] .............................................. B01F 3/04
[52] U.S. Cl. ................................... 261/112.2; 428/182
[58] Field of Search ....................... 261/112.2; 428/182

[56] References Cited

U.S. PATENT DOCUMENTS

| 3,612,494 | 10/1971 | Toyama et al. | 261/112.2 |
| 3,887,664 | 6/1975 | Regehr | 261/112.2 |
| 4,344,899 | 8/1982 | Monjoie | 261/112.2 |
| 4,374,542 | 2/1983 | Bradley | 261/112.2 |
| 4,500,583 | 2/1985 | Naul | 428/182 |

FOREIGN PATENT DOCUMENTS

| 559279 | 1/1983 | Australia | 261/112.2 |
| 1813087 | 6/1970 | France | 261/112.2 |
| 2748426 | 5/1978 | France | 261/112.2 |

Primary Examiner—Tim Miles
Attorney, Agent, or Firm—Klauber & Jackson

[57] ABSTRACT

In this invention, a cooling tower pack comprises a plurality of pack elements, each of which in plan has a stepped corrugate shape with a series of bridge portions separated by webs, each element in side elevation having a curved corrugate shape, and each element having small lands which are abutted by adjacent elements and thereby separate the elements and avoid large face-to-face contiguity areas, the lands causing only a minimum of crevice area between the adjacent elements of the pack.

8 Claims, 3 Drawing Sheets

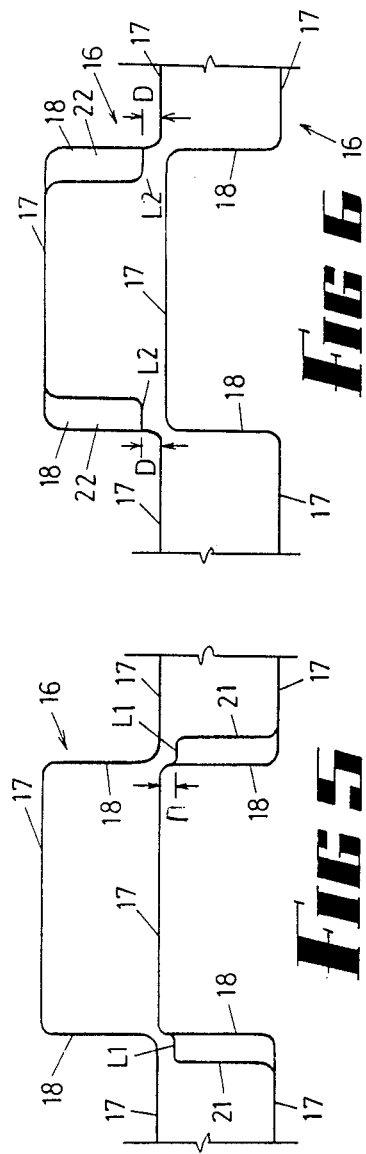
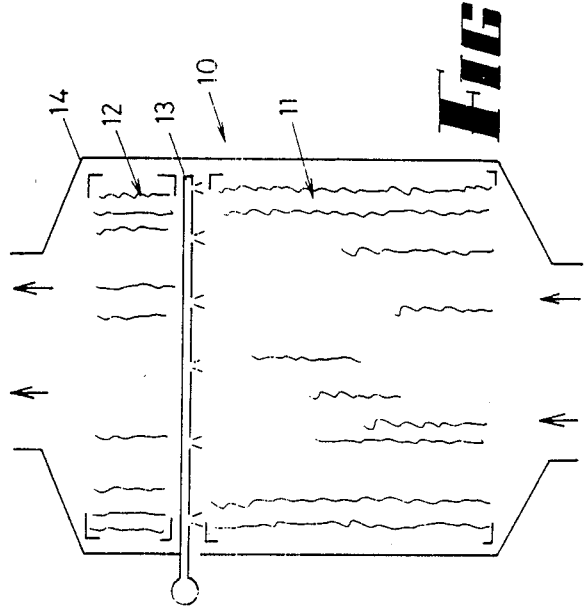

COOLING TOWER

This invention relates to a cooling pack and eliminator pack for a cooling tower, of the type wherein, in the cooling tower, water passes over a surface as a thin film, and is traversed by air which evaporates some of the water, and when an eliminator is used, the air traverses the eliminator pack and sheds droplets of entrained water. An engineering name for such a pack is "A direct contact mass and heat transfer pack", and it can be used for various purposes other than cooling towers or eliminator packs.

BACKGROUND OF THE INVENTION

The applicant herein was the inventor in the matter of Australian Patent No. 559279 (10254/83) in the name of Hydro Thermal Engineering Pty. Ltd. The cooling tower pack described and illustrated in that specification has proved to be particularly successful, and was based on the principle that the greater the ratio of interface area between water and air related to the volume of water in the pack, the greater the evaporation and hence the ability to cool the air and water. The pack described therein maintained water as a film over the surface of the pack elements as the water descended, and this has been proven to be an extremely efficient way to achieve a high degree of cooling.

The first object of the present invention is to provide improvements whereby the face-to-face contiguity of the cooling pack and eliminator pack elements is reduced so that there is a very small amount of crevice area, and in turn the possibility of algae growth, or legionella or other bacteria growth, is substantially reduced. A second object is to provide means whereby the size of the cooling pack for a given area of air/water interface, can be substantially less than with the arrangement previously invented by the inventor herein.

However difficulties of design occur when attempts are made to avoid face-to-face contact of bridge portions of the pack (as described in said specification No. 559279). If attempts are made to nest edges of one pack element against complementary surfaces of an adjacent pack element, the geometry is such that it becomes necessary to have different shapes for alternate elements, and this is uneconomical, both with regard to tooling and with regard to pack assembly. Furthermore, the reduction of surface-to-surface contact area is not as much as is regarded as desirable.

BRIEF SUMMARY OF THE INVENTION

In this invention, a cooling tower pack comprises a plurality of pack elements, each of which in plan has a stepped corrugate shape with a series of bridge portions separated by webs, each element in side elevation having a curved corrugate shape, and each element having small lands which are abutted by adjacent elements and thereby separate the elements and avoid large face-to-face contiguity areas, the lands causing only a minimum of crevice area between the adjacent elements of the pack.

In the aforesaid embodiment of this invention it has also been found that an eliminator pack formed substantially in the same configuration as the cooling pack provides an extremely efficient eliminator for elimination of water particles from the discharging air stream.

The principle of elimination of water particles from the air stream is that of causing a change in direction of air movement which causes the heavier than air water particles to collide with the surfaces of the eliminator pack so that such water can return into the tower body and not be discharged into the atmosphere.

The design of the eliminator is also concerned with minimising the resistance to air flow and the curved corrugate shape allows smooth air flow to occur with a minimum of turbulence. The "evaporation area" is also increased.

But more importantly, the invention limits crevices which could harbour and release biological and chemical substances which may cause disease and damage if allowed to escape into the environment as an aerosol or as particles.

It is currently considered by many authorities in the general science of cooling tower design that Legionnaire's Disease for example results from the victim breathing in an aerosol containing bacteria which has been allowed to proliferate in water cooling towers, and other devices such as showers, and be discharged into the environment.

The dimensions and spacing of the elements of both the eliminator pack and the cooling pack can be readily varied in order to vary the elimination and cooling performances required for any particular application.

More specifically, the invention consists of a cooling tower which comprises a stack of pack elements, each said element in plan having a stepped corrugate shape defined by a plurality of bridge portions which are separated by webs, each said element in side elevation having a curved corrugate shape defined by a plurality of alternate oppositely facing ridge portions, and lands on each element abutted by adjacent elements and separating the elements.

BRIEF DESCRIPTION OF THE DRAWINGS

An embodiment of the invention is described hereunder in some detail with reference to and is illustrated in the accompanying sketches, in which:

FIG. 1 illustrates a cooling tower having a cooling pack surmounted by an eliminator pack, FIG. 5 is a section taken on line 5—5 of FIG. 4, but showing the pack elements slightly separated, and FIG. 6 is a section similar to FIG. 5, but showing the section at line 6—6 of FIG. 4.

DETAILED DESCRIPTION OF THE PREFERRED EMBODIMENT

Figure 2:
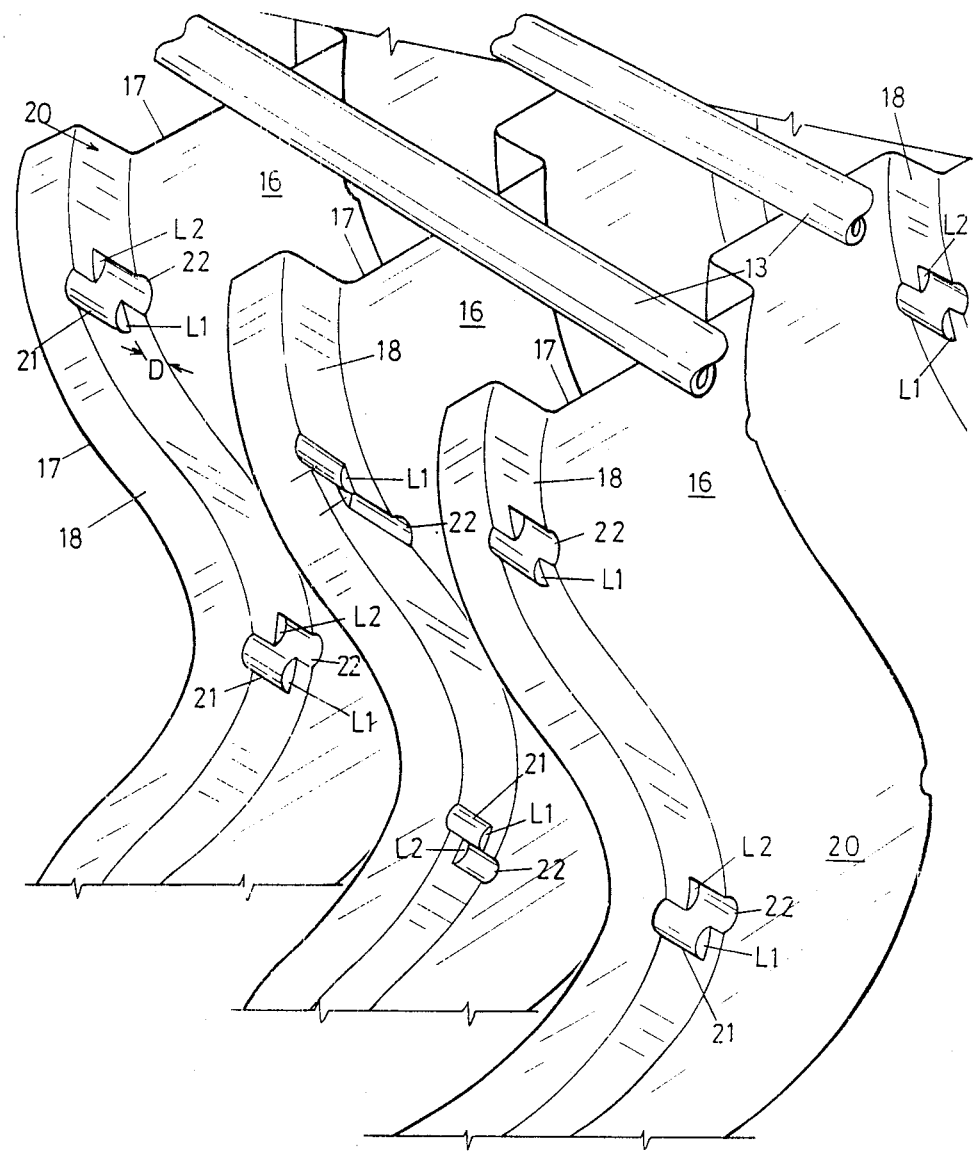
FIG. 2 is an "exploded" perspective view of pack elements, drawn to a larger scale.

FIG. 1 illustrates a cooling tower 10 which is provided with a cooling pack 11 surmounted by an eliminator pack 12, and between those two packs there is provided a plurality of water distribution pipes 13. The tower comprises an outer case 14 which houses the packs. The packs 11 and 12 are identical in the shape of their elements, and it is important that the elements should be assembled simply and inserted into outer case 14.

As explained above, this invention is directed to the shapes of the pack elements and their assembly, and each pack element 16 is corrugate in plan as best seen in FIGS. 2, 5 and 6, having a stepped corrugate shape defined by a plurality of bridge portions 17, joined by webs 18.

In side elevation (FIG. 4) the pack elements are of curved sinuous corrugate shape which is defined by a plurality of alternative oppositely facing ridge portions 20.

Figures 3, 4:
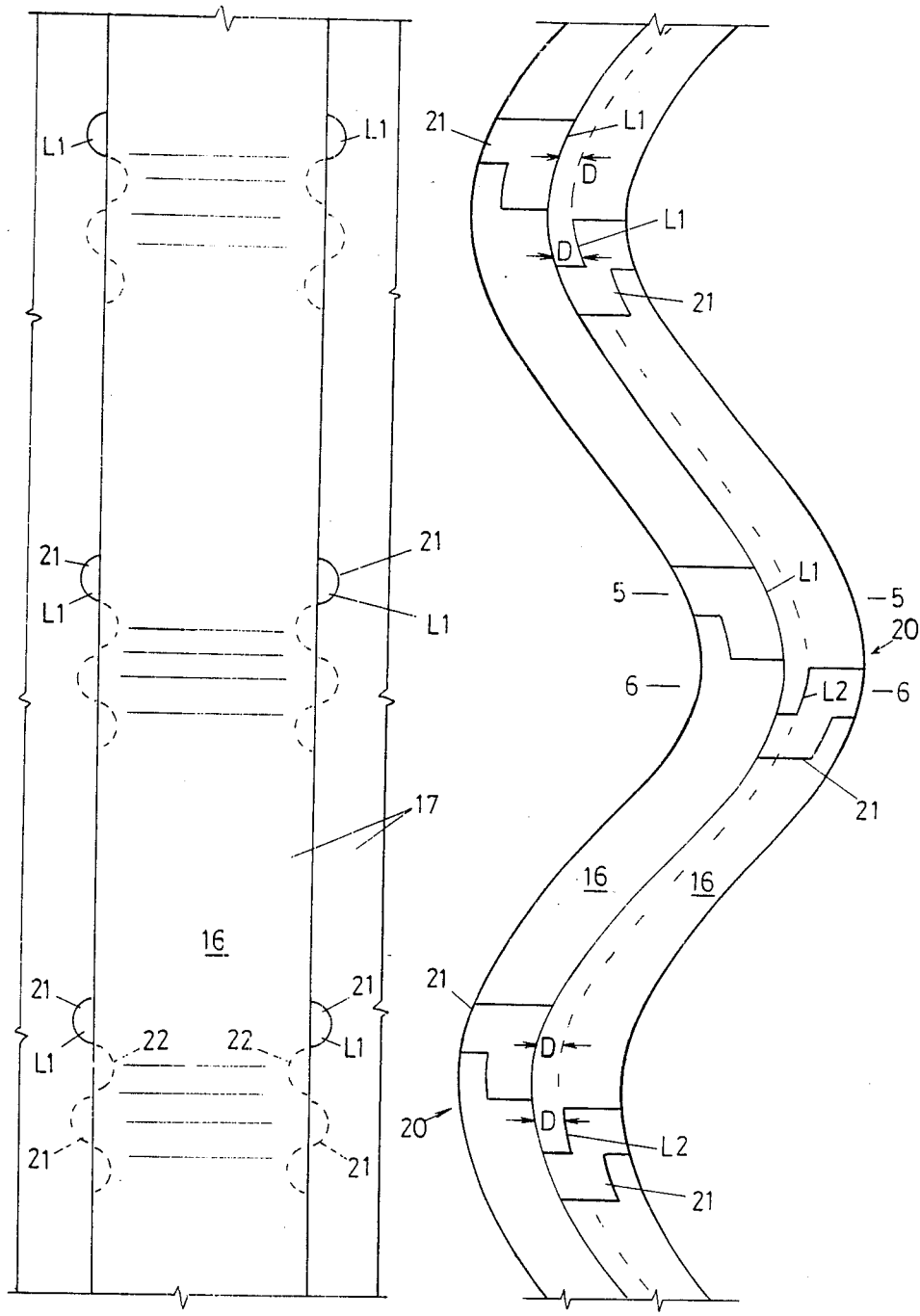
FIG. 3 is a fragmentary front elevation of a pack element.
FIG. 4 is a side elevation of FIG. 3, showing two pack elements assembled.

At the locality of each ridge portion 20 the webs 18 of each side of that ridge portion are deformed to have an outwardly convex projection 21 adjacent an outwardly concave projection 22 (this is probably best seen in FIGS. 2 and 3). On what may be regarded as the outer face of each web 18, the convex projections 21 terminate in a land designated L1, the land being spaced from the adjacent bridge portions 17 by a vertical distance D, while each of the concave projections 22 extends inwardly and extends up to that bridge portion 17, but terminates in a downwardly facing land L2, also a vertical distance D from the other bridge portion 17, as shown more specifically in FIGS. 5 and 6, and these lands L1 and L2 abut surfaces of adjacent pack elements 16, in each instance abutting a surface of a bridge portion 17 and a surface of a web. By this means therefore the pack elements 16 are accurately located with respect to each other.

In order that a single moulding can be used, alternative pack elements are reversed end to end with respect to the remainder, and as can be best seen in FIG. 4, the projections 21 and 22 are asymmetrical with the bridge portions 17, being off-set so that at the locality of every ridge portion 20, there are two abutment areas at L1 and L2 on each side of each bridge portion 17. Since the convex and concave portions 21 and 22 respectively open to the lower and upper portions of the channels as seen in FIGS. 5 and 6, each pack element 16 can be identical to the other pack elements and can be formed by a simple and inexpensive drape or vacuum moulding process. Since the corrugations in side elevation (FIG. 4) are smooth curved, very little turbulence will occur either to water which passes over their surfaces or to the flow of air, and yet as illustrated they have sufficient lateral displacement between ridge portions 20 for the eliminator pack 12 to be effective in eliminating droplets of water.

A consideration of FIGS. 5 and 6, and a comparison of corresponding drawings in said Australian Patent No. 559279 will indicate that this later invention greatly increases the evaporation surface area (to almost double that shown in the earlier Patent). By formation of the projections in the webs 18, any interruption to air and water flow is minimized, but obviously in some embodiments the projections can be from the bridge portions 17.

I claim:

1. A cooling tower pack comprising a stack of pack elements, each said element in plan having a stepped corrugate shape defined by a plurality of bridge portions which are separated by webs, each said element in side elevation having a curved corrugate shape defined by a plurality of alternate oppositely facing ridge portions, and lands on each element abutted by adjacent elements and holding the elements separated from each other with like bridges of adjacent elements in spaced-apart alignment.

2. A cooling tower pack according to claim 1 wherein each said land exists in a said web.

3. A cooling tower pack according to claim 1 wherein each said web comprises a plurality of outwardly convex projections each extending for portion only of the web, and terminating in a said land.

4. A cooling tower pack according to claim 1 wherein each said web comprises a plurality of outwardly concave, inwardly formed projections extending for portion only of the web, and terminating in a said land.

5. A cooling tower pack according to claim 1 further comprising an outer case retaining said elements stacked.

6. A cooling tower pack according to claim 1 wherein each said element comprises a thermoplastic sheet.

7. A cooling tower pack according to claim 1 wherein each said web is provided with a plurality of pairs of projections spaced along its length, each pair of projections comprising an outwardly formed convex portion of the web extending from one said bridge portion part-way across the web and terminating a distance 'D' from an adjacent said bridge portion, and an inwardly formed concave projection extending from that adjacent bridge portion towards said one bridge portion and terminating the same distance 'D' therefrom.

8. A cooling tower pack according to claim 7 wherein the shapes of the pack elements are similar, but adjacent elements are in reverse orientation with respect to each other and one land of each said pair of lands of any one element is abutted by a bridge portion of an adjacent element.

* * * * *